(12) United States Patent
Duerr

(10) Patent No.: US 9,739,366 B2
(45) Date of Patent: Aug. 22, 2017

(54) GEAR SHIFT DEVICE FOR A SHIFTABLE GEAR UNIT OF A POWER TOOL

(71) Applicant: Robert Bosch GmbH, Stuttgart (DE)

(72) Inventor: Thomas Duerr, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 714 days.

(21) Appl. No.: 13/850,526

(22) Filed: Mar. 26, 2013

(65) Prior Publication Data
US 2013/0247706 A1    Sep. 26, 2013

(30) Foreign Application Priority Data

Mar. 26, 2012 (DE) .................. 10 2012 204 752
Aug. 2, 2012 (DE) .................. 10 2012 213 723

(51) Int. Cl.
| | |
|---|---|
| *F16H 59/04* | (2006.01) |
| *B25F 5/00* | (2006.01) |
| *B25B 21/00* | (2006.01) |
| *F16H 3/62* | (2006.01) |

(52) U.S. Cl.
CPC .......... *F16H 59/042* (2013.01); *B25B 21/00* (2013.01); *B25F 5/001* (2013.01); *F16H 3/62* (2013.01); *F16H 59/041* (2013.01); *Y10T 74/20177* (2015.01)

(58) Field of Classification Search
CPC . B23B 45/02; B23B 21/00; B25F 5/00; B25F 5/001; F16H 3/62; F16H 59/02; F16H 59/04; F16H 59/041; F16H 59/042; F16H 59/047; F16H 63/32; F16H 63/38; Y10T 74/20177; Y10T 74/20183; Y10T 408/96

USPC ...... 173/47, 216, 1–11, 177–183; 74/473.37, 74/473.36; 200/547, 548, 522, 321, 200/318.2; 408/124, 126, 241 R; 475/298–300

See application file for complete search history.

(56) References Cited

U.S. PATENT DOCUMENTS

| | | | | |
|---|---|---|---|---|
| 6,070,675 | A * | 6/2000 | Mayer ............... | B25F 5/001 173/216 |
| 6,186,709 | B1 * | 2/2001 | Hsu .................. | B25F 5/001 200/318.2 |
| 6,676,557 | B2 * | 1/2004 | Milbourne ......... | B23Q 5/142 173/178 |
| 6,860,341 | B2 * | 3/2005 | Spielmann ......... | B25F 5/001 173/216 |
| 7,762,349 | B2 * | 7/2010 | Trautner ............ | B23B 45/008 173/104 |
| 8,075,229 | B2 * | 12/2011 | Mok ................. | B23B 31/123 279/62 |

(Continued)

FOREIGN PATENT DOCUMENTS

| | | |
|---|---|---|
| CN | 201552317 U | 8/2010 |
| CN | 102343579 | 2/2012 |

(Continued)

*Primary Examiner* — Hemant M Desai
*Assistant Examiner* — Valentin Neacsu
(74) *Attorney, Agent, or Firm* — Maginot, Moore & Beck LLP

(57) ABSTRACT

A gear shift device for a shiftable gear unit of a power tool includes a housing, an operating element, and a transmission member that acts upon a displaceable gear unit component. A bearing sliding guide is disposed in the interior of the housing and configured to slidingly guide the transmission member.

25 Claims, 3 Drawing Sheets

(56) References Cited

U.S. PATENT DOCUMENTS

| | | | | |
|---|---|---|---|---|
| 2002/0096343 | A1* | 7/2002 | Potter | B23B 45/008 173/216 |
| 2005/0043135 | A1* | 2/2005 | Potter | B23Q 5/142 475/298 |
| 2006/0090913 | A1* | 5/2006 | Furuta | B25B 21/00 173/48 |
| 2007/0175645 | A1* | 8/2007 | Milbourne | B23B 45/008 173/1 |
| 2008/0098842 | A1* | 5/2008 | Spielmann | B25F 5/001 74/473.1 |
| 2009/0003950 | A1* | 1/2009 | Mok | B23B 31/123 408/240 |
| 2009/0126954 | A1* | 5/2009 | Trautner | B23B 45/008 173/48 |
| 2009/0277658 | A1* | 11/2009 | Chen | B23B 45/008 173/183 |
| 2010/0163261 | A1* | 7/2010 | Tomayko | B23B 45/008 173/47 |
| 2011/0147021 | A1* | 6/2011 | Schaal | B25D 16/00 173/47 |
| 2011/0214891 | A1* | 9/2011 | Roehm | B25B 21/00 173/47 |
| 2011/0314948 | A1* | 12/2011 | Schulze | F16H 63/32 74/473.37 |

FOREIGN PATENT DOCUMENTS

| | | | | |
|---|---|---|---|---|
| DE | 39 04 085 | A1 | 8/1990 | |
| DE | 101 56 392 | A1 | 6/2003 | |
| DE | GB 2383387 | A * | 6/2003 | B24B 1/00 |
| DE | 10 2010 000 795 | A1 | 7/2011 | |
| EP | 1 364 752 | A2 | 11/2003 | |
| JP | 2004-160592 | A | 6/2004 | |

* cited by examiner

GEAR SHIFT DEVICE FOR A SHIFTABLE GEAR UNIT OF A POWER TOOL

This application claims priority under 35 U.S.C. §119 to patent application no. DE 10 2012 204 752.2, filed on Mar. 26, 2012 in Germany, and to patent application no. DE 10 2012 213 723.8, filed on Aug. 2, 2012 in Germany, the disclosures of which are incorporated herein by reference in their entirety.

BACKGROUND

The disclosure relates to a gear shift device for a shiftable gear unit of a power tool, in particular a hand power tool.

DE 101 56 392 A1 describes a gear shift device for a multi-stage gear unit of an electric tool. The gear shift device has a shift slide, which is mounted on the tool housing in a slidable manner and can be moved into various shift positions, and which displaces a wire bow that is coupled to a slidable ring gear of the gear unit. The wire bow, via its two arms, encompasses the gear unit housing and projects into the gear unit through opposing through-holes in the gear unit housing, the ends of the wire bow grasping the ring gear, which is mounted in the gear unit housing. For the purpose of setting the gear stage of the gear unit, the shift slide is displaced between the various shift positions, this shift is transmitted to the ring gear by the wire bow. To enable the wire bow to execute the relative movement in respect of the housing, the through-holes in the housing, through which the wire bow projects, are realized as oblong holes.

SUMMARY

The disclosure is based on the object of specifying, through simple design means, a compact gear shift device for a shiftable gear unit of a power tool. According to a further aspect of the disclosure, the housing, on which the gear shift device is disposed, is to be encapsulated outwardly.

This object is achieved through the features of the disclosure. The dependent claims specify expedient developments.

The gear shift device is used for shifting a multi-stage gear unit of a power tool, in particular a hand power tool. The gear unit has at least two gear stages, to which differing speed reducing ratios are assigned. The power tool is equipped with a drive motor, in particular an electric drive motor, and the gear stages of the gear unit can be used to set slower and faster rotational speeds. In the case of a hand power tool, for example, use of the gear shift device in a cordless power screwdriver or cordless power drill is a possibility.

The gear stages can be engaged by means of an operating element, which is disposed in a displaceable manner on the housing and which directly or indirectly displaces a transmission member that acts upon a displaceable gear unit component. The operating element can advantageously assume various latching positions, a gear stage corresponding, respectively, to each of the latching positions. Each actuating position of the operating element has assigned to it an actuating position of the gear unit component and a gear stage of the gear unit. The gear unit has, for example, two gear stages.

Disposed in the interior of the housing that accommodates the gear unit is a bearing sliding guide, in which the transmission member is slidingly guided. The bearing sliding guide inside the gear unit housing enables the gear shift device to be realized in a compact manner, since, unlike in the prior art, essential components of the gear shift device have been relocated to the inside of the gear unit housing. It is possible to dispense with a bearing sliding guide on the radial outside of the gear unit housing.

Furthermore, essential portions of the transmission member can also be disposed inside the gear unit housing. Thus, it is particularly expedient that, in relation to the total length of the transmission member, only a small portion projects past the radial outer circumference of the gear unit housing, in order to effect the connection to the operating element. The components necessary for the mounting of the operating element, on the other hand, are disposed inside the gear unit housing.

The gear unit is, for example, a planetary gear unit having at least two planetary stages that are each composed of a sun gear, planetary gears that are guided on a planet carrier, and a ring gear. For the purpose of shifting over between the gear stages, a ring gear or a shift ring, or shift ring gear, is displaced axially through actuation of the operating element, via the transmission member, as a result of which a different gear ratio becomes active in the transmission path between the drive motor and the tool receiver.

The bearing sliding guide is located within the gear unit housing, for example on a gear unit component, in particular a component disposed in an axially fixed and rotationally fixed manner such as, for example, a ring gear. Also possible in principle, however, is an axially displaceable component that is mounted in a rotationally fixed manner in the gear unit housing. It is also possible, furthermore, for the bearing sliding guide to be realized on the inner side of the gear unit housing, it being possible to provide this embodiment either as an alternative or in addition to the bearing sliding guide on the gear unit component. The bearing sliding guide is realized, for example, in the form of one or more longitudinal grooves, which is/are made in the gear unit component, or in the inner wall, of the gear unit housing, and in which a portion of the transmission member is slidingly guided. The sliding direction, or longitudinal extent, of the bearing sliding guide runs parallelwise in relation to the longitudinal axis of the power tool, or of the motor shaft of the drive motor.

The transmission member is realized, for example, as a wire bow, which has two bow arms, the free ends of the bow arms being in contact with the gear unit component to be displaced and being connected to the gear unit component. A central portion of the wire bow serves to effect connection to the operating element, which is disposed in a displaceable manner on the outside of the housing of the power tool. The wire bow has at least one axial portion, extending in the axial direction, which is accommodated in the bearing sliding guide. In the case of the bearing sliding guide realized as a longitudinal groove, the axial portion is accommodated and slidingly mounted in this groove. Advantageously, on each bow portion, respectively, the wire bow has an axial portion, extending in the axial direction, which is accommodated, respectively, in a groove-type bearing sliding guide.

According to a further advantageous embodiment, the transmission member is routed axially through an end face wall of the housing; the portion of the transmission member that is located outside of the interior of the gear unit housing serves to effect connection to the operating element. This embodiment has the advantage that it is possible to dispense with radial recesses or through-holes in the wall of the gear unit housing. The transmission member does not project through the wall of the gear unit housing in the radial direction, but instead is routed axially outward through the end face wall of the gear unit housing, such that the gear unit housing is encapsulated in the best manner possible, and an unwanted leakage of lubricating grease or transmission oil can be prevented. In particular, it is not necessary to provide oblong holes in the circumferential wall of the gear unit housing.

The part of the transmission member that projects through the end face wall expediently has a connecting portion, bent radially outward, which is connected to the operating element. It is thus possible for the coupling between the transmission member and the operating element to be disposed, on the one hand, axially outside of the gear unit housing and, on the other hand, on the radially outer side of the housing, in particular of a part of the housing of the power tool that accommodates the drive motor.

BRIEF DESCRIPTION OF THE DRAWINGS

Further advantages and expedient embodiments are given by the further claims, the description of the figures and the drawings. In the drawings:

In the figures, components that are the same are denoted by the same references.

DETAILED DESCRIPTION

Figure 1:
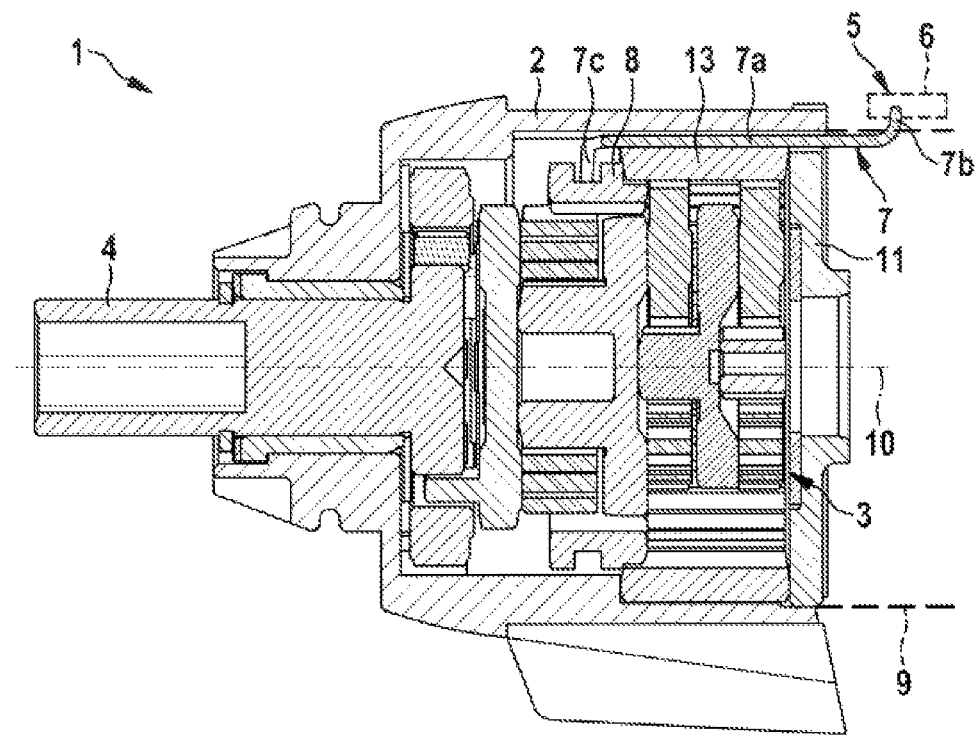
FIG. 1 shows a section longitudinally through the front region of a hand power tool, which has a planetary gear unit that is accommodated in a gear unit housing and that can be shifted between differing gear stages by means of a gear shift device, the gear shift device having a transmission member, which is realized as a wire bow and which is routed axially through a delimiting end face wall on the gear unit housing.

FIG. 1 shows a section through the front part of a hand power tool 1, for example a cordless power screwdriver or cordless power drill. In a gear unit housing 2, the hand power tool 1 has a planetary gear unit 3, which is driven on the input side by the motor shaft of an electric drive motor and, on the output side, drives a spindle 4, which is realized to receive a tool. The planetary gear unit 3 can be shifted between two differing gear stages having differing reducing ratio levels, for the purpose of setting differing rotational speeds. The shifting between the gear stages of the planetary gear unit 3 is effected by means of a gear shift device 5, which has an operating element 6, in the form of a sliding switch, and has a transmission member 7 that is coupled to the operating element 6 and transmits an actuating movement of the operating element to a shift ring gear 8 of the planetary gear unit 3. The operating element 6 is located on the outer circumferential surface of a housing 9, in particular of a housing for accommodating the electric motor, which housing directly adjoins the gear unit housing 2 axially. The actuating movement, both of the operating element 6 and of the transmission member 7 that is coupled to the operating element 6, is effected parallelwise in relation to the longitudinal axis 10 of the hand power tool, which axis at the same time constitutes the motor axis. The various shift stages of the operating element 6 are realized as latching positions.

The transmission member 7 is realized as a wire bow, whose bow halves each have a rectilinear axial portion 7a (FIG. 3), the axial portions 7a extending parallelwise in relation to the longitudinal axis of the motor. The axial portions 7a are accommodated and guided in longitudinal grooves 12 that are disposed in parallel and made in the circumferential surface of a ring gear 13 of the planetary gear unit 3, the longitudinal grooves 12 each constituting a bearing sliding guide in which the axial portions 7a are accommodated in an axially sliding manner. The axial portions 7a are connected to each other via a connecting portion 7b, by means of which the connection to the operating element 6 is effected. The free ends of the axial portions 7a each constitute a retaining portion 7c, pointing radially inward, which bears against the shift ring gear 8 and, upon an actuation of the operating element, displaces the shift ring gear axially within the gear unit housing 2.

On the side that faces away from the spindle 4, the gear unit housing 2 is closed by an end face wall 11, which separates the gear unit housing from the adjoining housing for accommodating the drive motor. Made in the circumference of the end face wall 11 are two recesses, or through-holes, 14, which lie in the extension of the longitudinal grooves 12 and through which the two axial portions 7a project.

The connecting portion 7b between the axial portions 7a is therefore located outside of the interior of the gear unit housing 2.

The connecting portion 7b outside of the gear unit housing is bent radially outward, and projects in the radial direction through a recess in the wall of the housing 9, such that the connection to the operating element can be effected.

This embodiment enables the interior of the gear unit housing 2 to be encapsulated, with the gear unit components of the planetary gear unit accommodated therein. To set the various gear stages, it is necessary only for the transmission member 7 to be moved axially, during which movement the axial portions 7a of the transmission member are moved along the longitudinal grooves 12 in the circumferential surface of the ring gear 13 and through the recesses 14 in the outer circumference of the end face wall 11. A sealing can be provided in the region of the recesses 14, in order to ensure that the gear unit housing is sealed tight.

Figure 2:
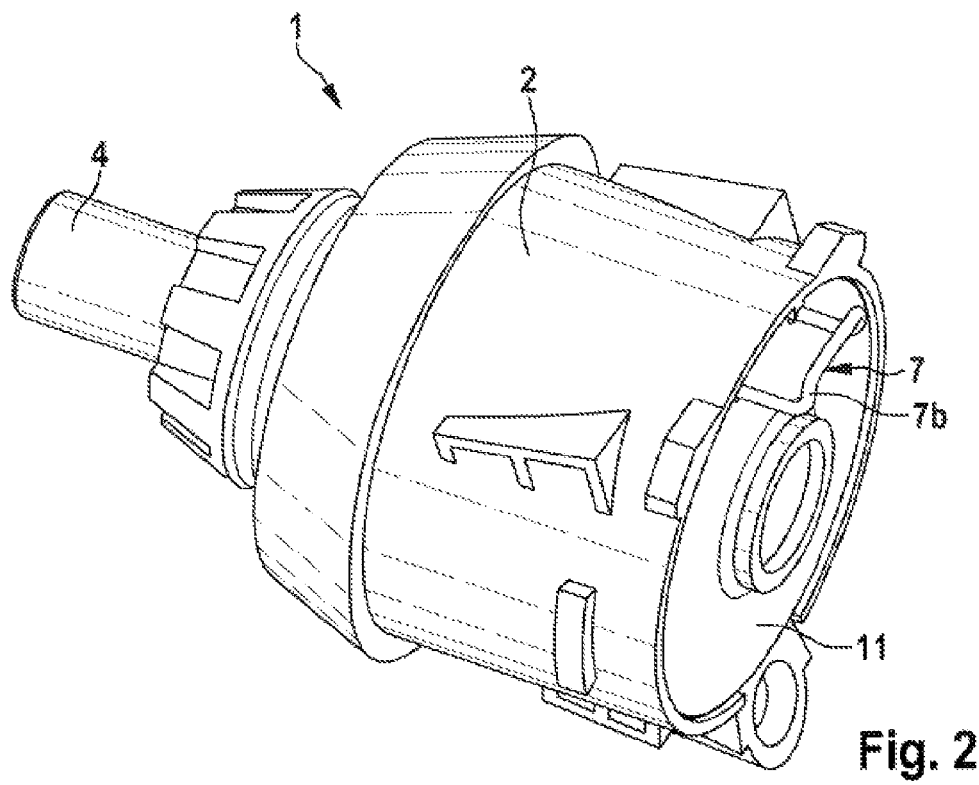
FIG. 2 shows a perspective view of the front part of the hand power tool.
Figure 3:
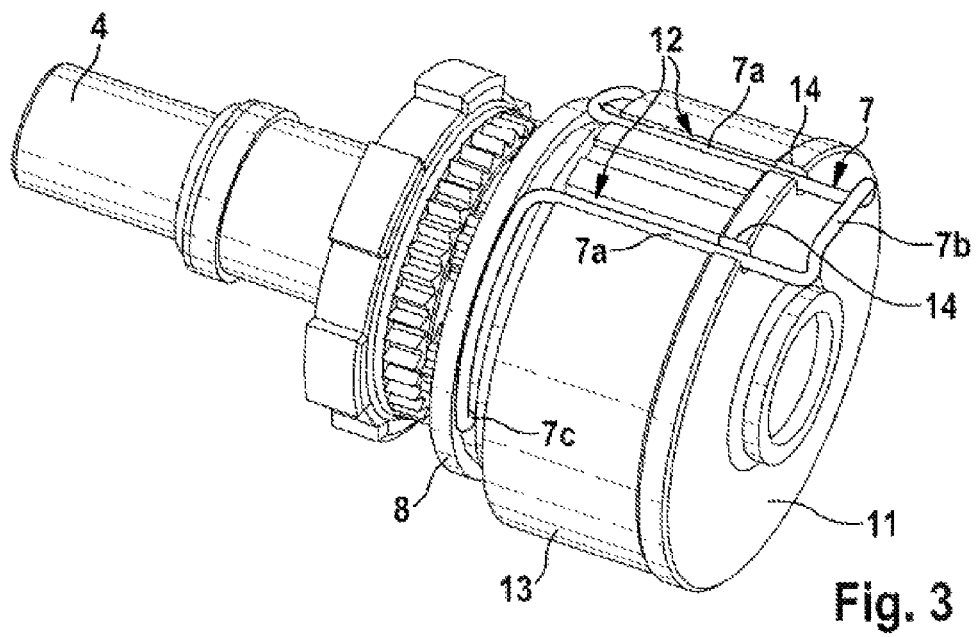
FIG. 3 shows a representation similar to that of FIG. 2, but without a gear unit housing.
Figure 4:
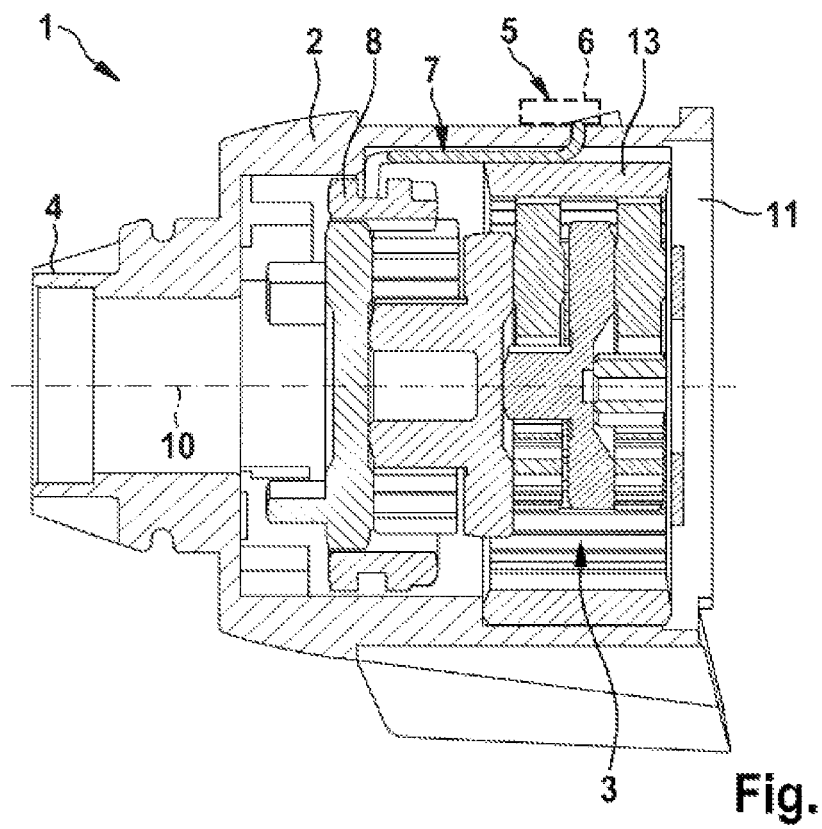
FIG. 4 shows a further section through the front part of a hand power tool having a gear shift device, in a further embodiment.
Figure 5:
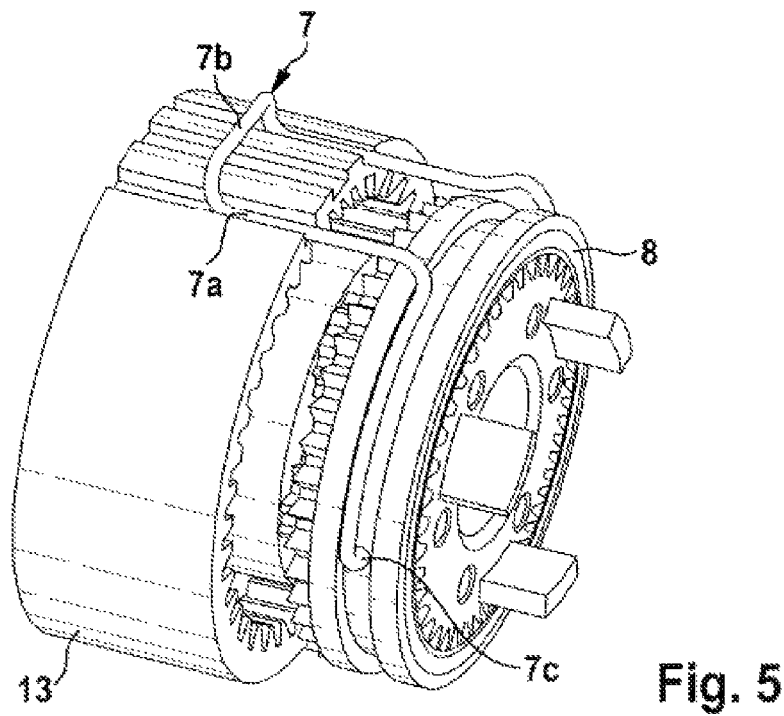
FIG. 5 shows a perspective representation of the front part of the hand power tool according to FIG. 4, but without a gear unit housing.

The exemplary embodiment according to FIGS. 4 and 5 corresponds substantially to the first exemplary embodiment according to FIGS. 1 to 3. What differs therefrom, however, is the realization of the gear shift device 5 with the transmission member 7 realized as a wire bow. The axial portions 7a of the transmission member 7 are not as long as in the first exemplary embodiment, and do not project past the rear end face wall 11 that axially closes the gear unit housing 2. The connecting portion 7b of the transmission member 7, which is bent radially outward, projects through an oblong hole in the circumferential surface of the gear unit housing 2, and is connected to the operating element 6, which is mounted slidingly on the outside of the circumferential surface of the gear unit housing, and which is realized as a sliding switch and can be slid axially and parallelwise in relation to the motor longitudinal axis 10. This exemplary embodiment, likewise, like the first exemplary embodiment, is distinguished by a compact design. The end face wall 11 can remain free of recesses or through-holes, since the transmission member 7 projects radially through the wall of the gear unit housing 2.

What is claimed is:

1. A gear shift device for a shiftable gear unit of a power tool, the gear unit having at least two gear stages, the gear shift device comprising:
   a non-pivoting transmission member configured to act upon a gear unit component, the gear unit component displaceable relative to a housing; and
   an operating element positioned outwardly of the housing and linearly displaceable relative to the housing, the operating element coupled to the transmission member to actuate the transmission member to act upon the gear unit component,
   wherein the transmission member is axially displaceable by the operating element between at least two actuating positions that correspond to the at least two gear stages of the gear unit, and
   wherein a bearing sliding guide is disposed in an interior of the housing, the bearing sliding guide receiving and slidingly guiding the transmission member, the bearing sliding guide disposed on a ring gear of the gear unit, the ring gear being axially and rotationally fixed relative to the housing.

2. The gear shift device according to claim 1, wherein the bearing sliding guide is disposed on an inner side of the housing.

3. The gear shift device according to claim 1, wherein the bearing sliding guide is a longitudinal groove.

4. The gear shift device according to claim 1, wherein the transmission member is a wire bow.

5. The gear shift device according to claim 4, wherein the wire bow has two bow halves, each bow half having a rectilinear axial portion that extends in an axial direction and is slidingly guided in the bearing sliding guide.

6. The gear shift device according to claim 5, wherein the two bow halves are connected to each other via a connecting portion, the connecting portion being coupled to the operating element.

7. The gear shift device according to claim 1, wherein the transmission member has at least one axial portion that extends in an axial direction and that is accommodated in the bearing sliding guide.

8. The gear shift device according to claim 1, wherein the transmission member is routed axially through an end face wall of the housing.

9. The gear shift device according to claim 8, wherein, outside of the end face wall, the transmission member has a connecting portion that is bent radially outward and that is connected to the operating element.

10. The gear shift device according to claim 1, wherein the gear unit is a planetary gear unit.

11. The gear shift device according to claim 1, wherein:
   the housing has a peripheral wall that defines the interior of the housing, and
   the bearing sliding guide does not extend from the interior of the housing to an exterior of the housing.

12. The gear shift device according to claim 1, wherein the ring gear is a shift ring gear.

13. The gear shift device according to claim 1, wherein the housing is a gear unit housing.

14. The gear shift device according to claim 1, wherein the bearing sliding guide is a longitudinal groove formed in a circumferential surface of the ring gear.

15. A hand power tool, comprising:
   a shiftable gear unit having at least two gear stages; and
   a gear shift device configured to shift the gear unit, the gear shift device including:
      a non-pivoting transmission member configured to act upon a gear unit component, the gear unit component displaceable relative to a housing; and
      an operating element positioned outwardly of the housing and linearly displaceable relative to the housing, the operating element coupled to the transmission member to actuate the transmission member to act upon the gear unit component,
      wherein the transmission member is axially displaceable by the operating element between at least two actuating positions that correspond to the at least two gear stages of the gear unit, and
      wherein a bearing sliding guide is disposed in an interior of the housing, the bearing sliding guide receiving and slidingly guiding the transmission member, the bearing sliding guide disposed on a ring gear of the gear unit, the ring gear being disposed within the interior of the housing.

16. The hand power tool according to claim 15, wherein the bearing sliding guide is a groove.

17. The hand power tool according to claim 16, wherein the groove is formed in a circumferential surface of the ring gear.

18. The hand power tool according to claim 15, wherein the ring gear is axially and rotationally fixed relative to the housing.

19. The hand power tool according to claim 15, wherein the bearing sliding guide is arranged on an interior wall of the housing.

20. The hand power tool according to claim 15, wherein the housing is a gear unit housing configured to retain the gear unit.

21. The hand power tool according to claim 15, wherein:
   the housing has a peripheral wall that defines the interior of the housing, and
   the bearing sliding guide does not extend from the interior of the housing to an exterior of the housing.

22. The hand power tool according to claim 15, wherein the ring gear is a shift ring gear.

23. The hand power tool according to claim 15, wherein the housing is a gear unit housing.

24. A gear shift device for a shiftable gear unit of a power tool, the gear unit having at least two gear stages, the gear shift device comprising:
   a non-pivoting transmission member configured to act upon a gear unit component, the gear unit component displaceable relative to a housing; and
   an operating element positioned outwardly of the housing and linearly displaceable relative to the housing, the operating element coupled to the transmission member to actuate the transmission member to act upon the gear unit component,
   wherein the transmission member is axially displaceable by the operating element between at least two actuating positions that correspond to the at least two gear stages of the gear unit,
   wherein a bearing sliding guide is disposed in an interior of the housing, the bearing sliding guide receiving and slidingly guiding the transmission member, and
   wherein the transmission member has at least one axial portion that extends in an axial direction and that is accommodated in the bearing sliding guide.

25. A hand power tool, comprising:
   a shiftable gear unit having at least two gear stages; and
   a gear shift device configured to shift the gear unit, the gear shift device including:

a non-pivoting transmission member configured to act upon a gear unit component, the gear unit component displaceable relative to a housing; and an operating element positioned outwardly of the housing and linearly displaceable relative to the housing, the operating element coupled to the transmission member to actuate the transmission member to act upon the gear unit component, wherein the transmission member is axially displaceable by the operating element between at least two actuating positions that correspond to the at least two gear stages of the gear unit, wherein a bearing sliding guide is disposed in an interior of the housing, the bearing sliding guide receiving and slidingly guiding the transmission member, and wherein the transmission member has at least one axial portion that extends in an axial direction and that is accommodated in the bearing sliding guide.

* * * * *